US011710162B2

(12) United States Patent
Driscoll et al.

(10) Patent No.: US 11,710,162 B2
(45) Date of Patent: Jul. 25, 2023

(54) UTILIZING A VEHICLE TO DETERMINE AN IDENTITY OF A USER

(71) Applicant: PAYPAL, INC., San Jose, CA (US)

(72) Inventors: Dennis Michael Driscoll, Chalfont, PA (US); Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 413 days.

(21) Appl. No.: 15/930,231

(22) Filed: May 12, 2020

(65) Prior Publication Data

US 2020/0380576 A1     Dec. 3, 2020

Related U.S. Application Data

(63) Continuation of application No. 15/894,859, filed on Feb. 12, 2018, now Pat. No. 10,650,425, which is a continuation of application No. 14/497,214, filed on Sep. 25, 2014, now Pat. No. 9,892,439.

(51) Int. Cl.
*G06Q 30/00*     (2023.01)
*G06Q 30/0601*     (2023.01)

(52) U.S. Cl.
CPC ..... *G06Q 30/0609* (2013.01); *G06Q 30/0633* (2013.01)

(58) Field of Classification Search
CPC ............... G06Q 30/00; G06Q 30/0601; G06Q 30/0609; G06Q 30/0623; G06Q 30/0627
See application file for complete search history.

(56) References Cited

U.S. PATENT DOCUMENTS

| 6,754,564 B2 * | 6/2004 | Newport | B60R 13/10 |
| | | | 701/1 |
| 2008/0208701 A1* | 8/2008 | Betancourt | G06Q 10/02 |
| | | | 705/26.8 |
| 2010/0161482 A1* | 6/2010 | Littrell | B60L 53/67 |
| | | | 705/40 |

(Continued)

OTHER PUBLICATIONS

Halevi, Tzipora, et al. "Secure proximity detection for NFC devices based on ambient sensor data." European Symposium on Research in Computer Security. Springer, Berlin, Heidelberg, 2012. (Year: 2012).*

(Continued)

*Primary Examiner* — Christopher B Seibert
(74) *Attorney, Agent, or Firm* — Haynes and Boone, LLP

(57) ABSTRACT

There are provided systems and methods for utilizing a vehicle to determine an identity of a user. A user may establish a vehicle as associated with the user, such as a vehicle owned by the user or used by the user. The vehicle may include a vehicle device that may be configured to establish connections with other devices using short range and network communications. In various embodiments, the other devices may be devices at merchant locations. Thus, a merchant at the merchant location may be informed about settings, preferences, and/or parameters for use of the vehicle established by the user. The merchant may receive these parameters even if another user is utilizing the vehicle, thus, establishing rules for use of the vehicle by the other user. In other embodiments, the other devices may be devices in other vehicles, allowing the users to communicate and set waypoints during trips.

20 Claims, 5 Drawing Sheets

(56) References Cited

U.S. PATENT DOCUMENTS

| | | | | |
|---|---|---|---|---|
| 2012/0072837 | A1* | 3/2012 | Triola | G06Q 10/10 |
| | | | | 715/268 |
| 2012/0109660 | A1* | 5/2012 | Xu | G06Q 50/30 |
| | | | | 707/769 |
| 2012/0155712 | A1* | 6/2012 | Paul | G06F 18/00 |
| | | | | 382/105 |
| 2012/0271816 | A1* | 10/2012 | Hansberger | G06Q 30/0623 |
| | | | | 707/E17.014 |
| 2012/0294238 | A1* | 11/2012 | Uhler | G08G 1/017 |
| | | | | 370/328 |
| 2012/0296747 | A1* | 11/2012 | Triola | G06Q 30/0613 |
| | | | | 705/14.66 |
| 2014/0136329 | A1 | 5/2014 | Chang | |
| 2015/0058224 | A1* | 2/2015 | Gaddam | G06Q 20/327 |
| | | | | 705/44 |
| 2015/0347715 | A1 | 12/2015 | Tilzer et al. | |
| 2017/0140641 | A1* | 5/2017 | Flick | B60R 25/24 |
| 2018/0003593 | A1* | 1/2018 | Siegel | B60C 11/246 |
| 2018/0089917 | A1* | 3/2018 | Obaidi | G06F 18/22 |

OTHER PUBLICATIONS

Leinmüller, Tim, et al. "Sevecom-secure vehicle communication." IST Mobile and Wireless Communication Summit. No. POST_TALK. 2006. (Year: 2006).*

"Ad agencies hit back at customer loyalty; The IPA has challenged of loyalty marketing by calling for more emotive brand-builduing. But extra research needsto be done, says Alan Mitchell", Marketing Week, Jul. 8, 1999, pp. 22(1), [retrieved on Sep. 26, 2017]. Retrieved from the Internet: <URL:https//dialog.proquest.com/professional/professional/docview/667695508_?>.

* cited by examiner

UTILIZING A VEHICLE TO DETERMINE AN IDENTITY OF A USER

CROSS REFERENCE TO RELATED APPLICATIONS

This application is a continuation of U.S. patent application Ser. No. 15/894,859 filed Feb. 12, 2018, which is a continuation of U.S. patent application Ser. No. 14/497,214 filed on Sep. 25, 2014, now U.S. Pat. No. 9,892,439, all of which are hereby incorporated by reference in their entirety for all purposes.

TECHNICAL FIELD

The present application generally relates to utilizing a vehicle to determine an identity of a user and more specifically to detecting a vehicle through a connection between a vehicle device for the vehicle and another device in order to determine an identity of a user associated with the vehicle.

BACKGROUND

A user may utilize another user's vehicle, such as a child operating a parent's vehicle. The user owning and/or allowing use of the vehicle may wish to establish certain parameters for use of the vehicle. In order to enforce these uses of the vehicle, the owning user may inform the other operating user of these parameters. However, the other user may forget the parameters or may willfully ignore the parameters. Additionally, the user operating the vehicle may assist the owning user with picking up and/or purchasing items for the owning user, such as a prescription. In such cases, the merchant may require some identification of the owning user in order to release the items to the operating user.

Additionally, two or more vehicles may travel together, such as friends and/or family engaging in an outing or vacationing together. In order to travel together, the users operating the vehicles may be required to plan a route to take during the trip. One or more of the users operating the vehicles may decide to deviate from the preplanned route. However, in order to alert the other operators of the vehicles, the users must contact the other users, which may be dangerous and/or illegal while driving. Moreover, if the vehicles become separated, one or more of the users may become lost and require guidance, which may be impossible if the users do not know of the endpoint to the route.

Figure 1:
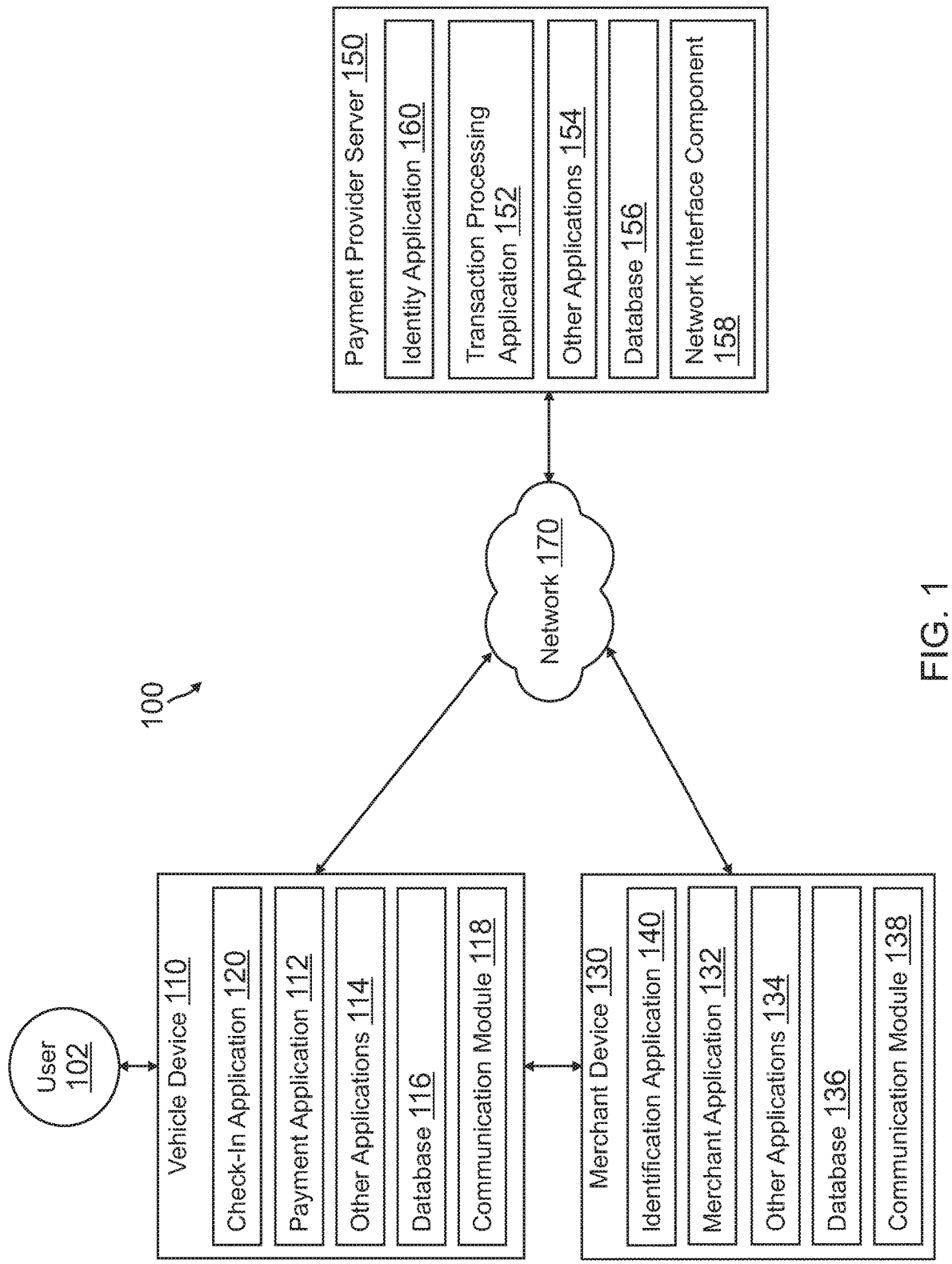
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for utilizing a vehicle to determine an identity of a user. Systems suitable for practicing methods of the present disclosure are also provided.

A user may utilize a vehicle that the user owns or a vehicle of another user. In various embodiments, the vehicle may belong to a service that the user utilizes, such as a company car, rental vehicle, a fleet vehicle, and/or a car share service. When using a vehicle, the user may check-in to the vehicle by providing some information to a device associated with the vehicle. The user may check-in by providing a log in credential to a user account for the user, for example, a name and PIN/password associated with the user account. The user may also check-in to the vehicle's device by connecting to the vehicle's device using a user device of the user. In such embodiments, the user may have a mobile/smart phone, wearable computing device (e.g., eyeglasses or wristwatch with processing features), tablet computer, or other user device. The device for the vehicle may correspond to a dashboard or other onboard computing device, or may correspond to a device associated with an owner, driver, or primary user of the vehicle, such a mobile/smart phone, tablet computer, wearable computing device, or other user device. The device in the vehicle may provide short range wireless communications with the user device for the user in the vehicle, such as through Bluetooth Low Energy (BLE), LTE Direct, WiFi, near field, or other communication protocols. Once the vehicle's device and the user's device connect, the user may be checked-in to the vehicle. The user may also be checked-in to the vehicle through biometrics and biometric reading devices utilized by the vehicle device, such as a fingerprint scanner (e.g., a fingerprint scanner on a door handle, steering wheel, or input device of the vehicle device), eye/retinal scanner, DNA reader, breathalyzer, etc. By checking in to the vehicle, the vehicle's device may be provided with check-in information, such as an identifier, a user account, or other identification information for the user. Once the user is checked-in to the vehicle, the user may set or load settings, preferences, parameters, and/or entitlements for the user to the vehicle device and/or a service provider server, such as a payment provider.

In other embodiments, the user need not check-in to the vehicle and instead may preset the settings, preferences, parameters, and/or entitlements with the vehicle device and/or the service provider. This may be the case where the user wishes to have such information used when the user is not utilizing the vehicle, for example, when allowing another user to operate the vehicle. Thus, the user may utilize a user device and/or the vehicle's device to establish the information for the vehicle so that during use of the vehicle, the information may be retrieved and utilized.

In various embodiments, the information may include entitlements to items and/or services from a merchant, referred to collectively as "item" or "items." For example, the user may pre-purchase items from a merchant and store a receipt or other information documenting the purchase so that when the user and/or a vehicle for the user is detected at a merchant location for the merchant, the items may be relinquished. The entitlement may also correspond to a prescription or other information about items the user is authorized to purchase (e.g., items requiring an authorization to purchase). Other entitlements to items may include maintenance plans and/or services pre-purchased or obtained by the user for the vehicle, such as a maintenance schedule for the vehicle, or other services requested by the user.

The information may also include settings, preferences, and/or parameters for use of the vehicle. Such preference information may include a type of fuel for use in the vehicle, an octane rating of the fuel used for the vehicle, other types of use and/or servicing of the vehicle (e.g., maintenance schedules including oil changes, car washes, etc.), and/or locations and routes the vehicle may visit or utilize (e.g., a preference to avoid certain areas, toll roads, etc.). The user may establish these preferences as the preferred use of the vehicle but allow changes and/or modifications to the preferences. Thus, if the user or another user wishes to deviate from the preferences, they may do so. However, in other embodiments, the preferences may be established as the sole use of the vehicle by the user or another user. Thus, the preferences may not be changed during use of the vehicle (e.g., requiring only Supreme octane gasoline, preventing payment for use of the vehicle on toll roads, etc.).

The user may also set personal information about the user and/or vehicle. Personal information may include an identifier for the user/vehicle, information about the user/vehicle, a route the user/vehicle is going to or has travelled, and waypoints for the vehicle during travel or for other vehicles. The personal information may also include authorized users of the vehicle. Once the information about the user and/or vehicle is established as corresponding to the vehicle, the information may be communicated to another device/server once the vehicle's device connects to the other device/server. For example, the vehicle may be detected at a merchant's location when the vehicle's device checks in to the merchant location (e.g., using a connection between the vehicle's device and a merchant device at the merchant location or through a check-in application providing GPS or mapping coordinates for the vehicle). Once checked-in to the location, the preferences, entitlements, and/or personal information set for the vehicle may be transmitted to the device at the location, enabling the merchant, service provider, or other entity at the location to determine an identity of a user associated with the vehicle (e.g., the owner of the vehicle) and/or provide items to a user of the vehicle corresponding to the user associated with the vehicle.

Thus, another user may utilize a vehicle while still identifying the owner or user normally associated with the vehicle to prove their identity and/or control use of the vehicle. Additionally, the vehicle may act as a second form of identification for the user, thereby assisting in fraud prevention by identifying the vehicle and thus the user when the vehicle is located at the same or similar location as the user associated with the vehicle. The vehicle may also identify the user to nearby other vehicles, allowing the other users to view where the vehicle and the associated user are on a map. The user may then utilize the vehicle's device to set routes and/or waypoints on the map for the other users to view while travelling.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a vehicle device 110, a merchant device 130, and payment provider server 150 in communication over a network 170. User 102, such as a driver or operator of a vehicle corresponding to vehicle device 110, may utilize vehicle device 110 to check-in to a location corresponding to merchant device 130, such as a merchant location or service provider location. In other embodiments, user 102 may connect to another vehicle device through vehicle device 110. Vehicle device 110 may then provide identity information about a user associated with the vehicle to merchant device 130. Such identity information may correspond to user 102 and/or an owner of the vehicle. Payment provider server 150 may store and/or provide the identity information. User 102 may then utilize vehicle device 110 to process transactions with merchant device 130, for example, using payment provider server 150.

Vehicle device 110, merchant device 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Vehicle device 110 may be implemented using any appropriate hardware and software configured for wired and/or wireless communication with merchant device 130 and/or payment provider server 150. In various embodiments, vehicle device 110 may be implemented as a device for use in a vehicle corresponding to vehicle device 110, such as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®, which may provide processing services for the vehicle. Vehicle device 110 may also be implemented as a device physically attached to and/or connected to the vehicle, such as a dashboard or central console computing system, a heads up display with attached processing devices, and/or a similar in vehicle on board computing system. Although a vehicle device is shown, the vehicle device may be managed or controlled by any suitable processing device. Although only one vehicle device is shown, a plurality of vehicle devices may function similarly. Moreover, in various embodiments, one or more of the applications, processes, and/or features discussed below in reference to vehicle device 110 may be included in a user device connected to vehicle device 110 and/or corresponding to the vehicle. Additionally, one or more of the applications, processes, and/or features discussed below in reference to payment provider server 150 may be included in vehicle device 110. For example, the processes and features of an identity application 160 of payment provider server 150 may be implemented on vehicle device 110 instead.

Vehicle device 110 of FIG. 1 contains a check-in application 120, payment application 112, other applications 114, a database 116, and a communication module 118. Check-in application 120, on board applications 140, and other applications 114 may correspond to processes, procedures, and/or applications, for example, a software program, executable by a hardware processor. In other embodiments, vehicle device 110 may include additional or different software as required.

As previously discussed, vehicle device 110 may be located in, attached and connected to, and/or associated with a vehicle. User 102 may utilize a user device (e.g., a mobile/smart phone, laptop or tablet computer, wearable computing device, or other device) to connect to vehicle device 110 in order to provide information to vehicle device 110 to associates user 102 with the vehicle (e.g., travelling in and/or utilizing the vehicle). Thus, connection between the user device and vehicle device 110 may utilize short range wireless communications of vehicle device 110 to establish a connection, including transmitting an identifier such as a Universally Unique Identifier (UUID). If vehicle device 110 receives a request to establish the connection with vehicle device 110 and responds with an identifier for vehicle device 110 (potentially including the UUID and other information necessary to effectuate a check-in for user 102 in the vehicle), vehicle device 110 to ramp up in power and create a connection between the user device and vehicle device 110.

Thus, vehicle device 110 may uniquely transmit the request to establish the connection with vehicle device 110 as a short range wireless communication (e.g. a BLE protocol communication) including a "wake up" process for the user device and/or a token for vehicle device 110 transmitting the request. In other embodiments, the request and/or connection may utilize near field communication, radio communication, infrared communication, or Bluetooth communication. Additionally, although vehicle device 110 may utilize BLE protocol communications to effectuate an "always on" type service where the UUID and "wake up" process are transmitted continuously by vehicle device 110, other communication protocols used to provide an "always on" service may include QUALCOMM® LTE Direct or similar device-to-device communication technology. BLE and LTE Direct may both be utilized to provide discovery of nearby devices to vehicle device 110 and establishment of a connection for data transfers.

In various embodiments, vehicle device 110 may also request a check-in from user 102 directly, for example, using an input device associated with vehicle device 110. In such embodiments, user 102 may provide an identifier, user account name, password, and/or PIN directly to vehicle device 110 without the use of a user device. The user may also be checked-in to the vehicle through vehicle device 110 using biometrics and biometric reading devices utilized by vehicle device 110, such as a fingerprint scanner (e.g., a fingerprint scanner on a door handle, steering wheel, or input device of the vehicle device), eye/retinal scanner, DNA reader, breathalyzer, etc. Such information may be entered to vehicle using an interactive touch screen, a keyboard, a mouse, a biometric reader, or other input device for vehicle device 140. Vehicle device may then confirm that user 102 is located within the vehicle corresponding to vehicle device 110 and thus act as identification for user 102. Additionally, any settings, entitlements, preferences, parameters, travel routes (including waypoints), and/or other information may be loaded to vehicle device 110 and/or payment provider server 150 (e.g., from the user device input, vehicle device 110 input, and/or payment provider server 150 input).

However, in other embodiments, user 102 may not be required to actually check-in to vehicle device 110 and thus be considered to be utilizing the vehicle corresponding to vehicle device 110. For example, another user may be operating the vehicle corresponding to vehicle device 110 and user 102 may wish for the vehicle to be associated with user 102 (e.g., have the settings, parameters, entitlements, preferences, routes, and/or other information set by user 102 for the vehicle to be used while the other user is operating the vehicle). Thus, user 102 may instead set the information for user 102 corresponding to use of the vehicle to be set with vehicle device 110 so that when vehicle device 110 checks in to a location (e.g., through another device/server), the information may be recalled and utilized with the vehicle. User 102 may utilize another user device and/or vehicle device 110 to set the information (e.g., stored on vehicle device 110 and/or payment provider server 150). The information may then be transmitted to merchant device 130 and/or another vehicle device functioning similar to vehicle device 110 from vehicle device 110 and/or payment provider server 150. The information may be transmitted to one or more of the devices when check-in application 120 connects to merchant device 130 or another vehicle device functioning similar to vehicle device 110, as will be explained in more detail herein.

Thus, vehicle device 110 includes check-in application 120 that may be used by vehicle device 110 to establish a connection with merchant device 130 and/or another vehicle device functioning similar to vehicle device 110 for another vehicle and/or check-in to a location corresponding to merchant device 130 and/or the other vehicle. Check-in application 120 may correspond to a specific application utilized by vehicle device 110 to establish the connection and/or establish the check-in (e.g., a dedicated application for connections/check-ins). The connection and/or check-in may provide and/or verify the identity of user 102, including transmission of an identifier for user 102, vehicle device 110, and/or a user account for user 102 with payment provider server 150. For example, the connection may provide the identification information to merchant device 130 and/or the other vehicle's device. In other embodiments, the check-in may be completed over network 170 with merchant device 130, payment provider server 150, and/or another service offering check-in services based on a geo-location (e.g., GPS or other mapping coordinates) for the vehicle corresponding to vehicle device 130. In such embodiments, check-in application 120 may correspond more generally to a browser application configured to communicate with network 170.

However, where check-in application 120 utilizes communications directly with merchant device 130 and/or the other vehicle's device, check-in application 120 may also receive and/or transmit short range wireless communications from vehicle device 110 when in proximity to merchant device 130 or the other vehicle's device. Check-in application 120 may transmit information to merchant device 130 or the other vehicle's device, such as the aforementioned identification information for user 102 and/or vehicle device 110. In such embodiments, check-in application 120 may execute in the background of an operating system of vehicle device 110 and be configured to establish connections, using communication module 118 of vehicle device 110, with merchant device 130 and/or the other vehicle's device. The connection may be established with or without user input from a user of the vehicle corresponding to vehicle device 110. For example, vehicle device 110 may broadcast a token, such as a universally unique identifier (UUID), for reception by merchant device 130 and/or the other vehicle's device.

As previously discussed, check-in application 120 may also be utilized to connect to merchant device 130 and/or establish a check-in with a merchant location corresponding to merchant device 130. In such embodiments, check-in application 120 may provide merchant device 130 with entitlements, settings, preferences, and/or parameters set by user 102 for usage with the vehicle corresponding to vehicle device 110. Such information may also be displayed in check-in application 120 or a corresponding application (e.g., purchase application 112) in order to inform the user of the vehicle corresponding to vehicle device 110 of the information. Such information may be stored by vehicle device 110 in database 116 or may be loaded to vehicle device 110 from payment provider server 150 when check-in application 120 forms the connect and/or checks-in to the location. Thus, even when user 102 is not present in the vehicle, a user of the vehicle may view preconfigured information for the vehicle, as set by user 102. In various embodiments, this preconfigured information may include one or more items user 102 has purchased or has an entitlement to (e.g., a prescription, maintenance schedule, etc.). Thus, the user (e.g., the operator) utilizing the vehicle corresponding to vehicle device 110 may pick up the item(s) corresponding to the entitlement(s) for user 102 from the merchant corresponding to merchant device 130 even if user 102 is not physically present.

The information stored for use with the vehicle corresponding to vehicle device 110 may also include settings, parameters, and/or preferences for use of the vehicle. Such preferences may correspond to a fuel type/octane rating, a use of the vehicle, and/or a maintenance schedule of the vehicle set by user 102. Thus, once the information is communicated to merchant device 130 and/or displayed to another user presently utilizing the vehicle, the user/merchant may be aware of such preferences in order to correctly use the vehicle as user 102 wishes even if user 102 is not present in the vehicle. User 102 may lock the preferences to prevent changes by the user (e.g., operator) of the vehicle and/or the merchant corresponding to merchant device 130. Thus, a transaction for one or more items that deviates from the preference may not be completed and/or the user/merchant may be instructed of the lock and inability to change the preferences. For example, an operator of the vehicle may be prevented from using payment application 112 to purchase fuel at a lower octane rating or from a different fuel provider than desired by user 102. In other embodiments, user 102 may instead allow changes and/or may be updated of changes to the preferences done by the user/merchant during use of the vehicle.

As previously discussed, vehicle device 110 may correspond to a plurality of vehicle devices functioning similarly. Thus, vehicle device 110 may also receive the aforementioned token from one or more nearby vehicle devices. In such embodiments, check-in application 120 may instead utilize communication module 118 of vehicle device 110 to receive the token from the other vehicle's device, and process the token to establish a connection and/or process a check-in for the other vehicle nearby vehicle device 110. If check-in application 120 acknowledges the UUID as identifying the other vehicle, check-in application 120 may transmit an identifier corresponding to user 102 and/or vehicle device 110 to the vehicle's device transmitting the token. Check-in application 120 may utilize communication module 118 of vehicle device 110 to communicate with the other vehicle's device (e.g., over near field communication, Bluetooth, Bluetooth Low Energy, radio, infrared, LTE Direct, or other connection). The identifier from vehicle device 110 transmitted to the other vehicle's may include, be transmitted with, concatenated with, or otherwise bundled with the received token. Once the identifiers for the two vehicle devices have been exchanged, the two vehicle devices may be connected and/or a check-in for each vehicle device may be established with each other. In other embodiments, the two vehicle devices may instead establish the check-in and/or location service with another entity or server over network 170. In such embodiments, vehicle device 110 and/or the other vehicle's device may view the checked-in vehicle devices using the service, for example, on a map displayable by the vehicle device.

In various embodiments, once the two vehicle devices are connected, information may be transmitted to the other vehicle's device, such as a name or other personal information for user 102, a user account for user 102 with vehicle device 110 or payment provider server 150, log in information for user 102 with vehicle device 110, other identification information, a map/route established with vehicle device 110, waypoints entered to vehicle device 110, other mapping information, purchases entered to vehicle device 110, and/or other types of shared information between two vehicles. Similar information may also be received from the other vehicle's device, such as a user associated with the other vehicle, map/routing/waypoint information, purchases, and/or other types of shared information. Such information may be displayable in check-in application 120 or may be utilized with another application of vehicle device 110 (e.g., payment application 112, a mapping or GPS application of other applications 114, etc.). For example, a mapping application may display a route, location for the other vehicle, and/or established waypoints for the other vehicle. Check-in application 120 may also display a name or identifier of the user normally associated with the vehicle and/or of the user currently using the vehicle in order to prevent fraud. Thus, if the vehicle is being incorrectly used, a user utilizing vehicle device 110 may view the fraudulent usage and alert an authority, for example, through a phone/messaging application of other application 114, through a mobile phone/user device, and/or through payment provider server 150.

Check-in application 120 may also be utilized to input further user preferences for user 102 for use with waypoints used by vehicle device 110 with a mapping application. As previously discussed, the waypoints may be received from another vehicle device or a service provider, or may be input by user 102 for a route that user 102 is travelling (e.g., a vacation, trip, etc.). User 102 may set settings, preferences, and/or parameters that may be utilized with the route. Such preferences may correspond to user 102 and may include preferences to avoid traffic/weather, stop at certain locations or type of locations, route through scenic or fastest routes, or other types of detours, rerouting, or stops. For example, user 102 may set their identity with check-in application 120 to avoid traffic and stop for food if traffic is too heavy in a route that the vehicle for vehicle device 110 must travel. In other embodiments, check-in application 120 may include preference to stop for antiquing, amusement parks, or other types of interests for user 102. Check-in application 120 may receive settings of how far user 102 is willing to travel off the established route between waypoints for their set preferences, such as only detouring up to 20 minutes or 5 miles in order to visit such a preference (e.g., to visit an amusement park, restaurant, avoid traffic, etc.). Such settings of how much user 102 is willing to detour may come from entered preferences by user 102 or may be determined using a calendar for user 102. For example, if user 102 is expected to be at a location at 6 PM and user 102's current route to the waypoint places user 102 at the waypoint at 5:30 PM, user 102 may have up to 30 minutes to detour to various entered preferences. Once user 102 has detoured to the preferences, either through instructions by the mapping application or independently by user 102, user 102 may be rerouted to the waypoint with respect to their set preferences. Additionally, if such a preference requires payments (e.g., preordering food, purchasing admission tickets, etc.), check-in application 120 may interface with payment application 112 to provide payment options ahead of arrival by user 102.

Payment application 112 may be used, for example, to provide a convenient interface to permit a user of the vehicle corresponding to vehicle device 110 to select payment options and provide payment for one or more items, which may correspond to selected entitlements and/or preferences of user 102. For example, payment application 112 may be implemented as an application having a user interface enabling the user to enter payment options for storage by vehicle device 110, provide payment to a user/entity (e.g., a merchant corresponding to merchant device 130) for one or more items, and complete a transaction for the item(s), in various embodiments, using payment provider server 150. In this regard, payment application 112 may correspond to an application that may provide an interface where the user (e.g., operator) of the vehicle corresponding to vehicle device 110 may view entitlements and/or preferences for user 102 that may correspond to the vehicle. As previously discussed, vehicle device 110 may access the entitlements and/or preferences from database 116 and/or payment provider server 150. A payment request may be generated for one or more items corresponding to the entitlement/preference, where the payment request may instruct payment provider server 150 to provide payment for the item(s). Additionally, the payment request may denote a payment instrument that payment provider server 150 may utilize to provide the payment. Payment application 112 may correspond to a dedicated application for payment provider server 150 (e.g., a specific device application) or may correspond to a browser application.

In other embodiments, payment application 112 may utilize another payment instrument, such as a credit/debit card, a bank account, etc. The payment request may correspond to a token including the selected payment instrument. Vehicle device 110 may transmit the payment request to payment provider server 150 with an identifier for the entity receiving payment in order to complete the payment. In other embodiments, the user (e.g., operator) of the vehicle corresponding to vehicle device 110 may provide payment to the entity (e.g., the merchant corresponding to merchant device 130) directly, for example, using cash, a bank account, payment card, and/or payment account with payment provider server 150.

In various embodiments, one or more features of check-in application 120 and/or payment application 112 may be incorporated in the same application so as to provide their respective features in one application.

Vehicle device 110 includes other applications 114 as may be desired in particular embodiments to provide features to vehicle device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow an owner/operator of a vehicle corresponding to vehicle device 110 to send and receive emails, calls, texts, and other notifications through network 170. Such communication applications may also correspond to mobile, satellite, wireless Internet, and/or radio communication applications connected to car services, such as OnStar®, which may be configured to interact with one or more other vehicle devices functioning similar to vehicle device 110 in order to facilitate mapping, communication, and/or emergency services. Other applications may include mapping and/or GPS applications configured to display other connected/checked-in vehicles and/or merchant location, routes received from other connected/checked-in vehicles, locations and waypoints received from other connected/checked-in vehicles, or other aforementioned information that may be utilized during travel, including the identity of a user associated with the other vehicle and/or checked-in to the other vehicle. In various embodiments, other applications 114 may include financial applications, such as banking, online payments, money transfer, or other financial applications. Other applications 114 may contain other software programs, executable by a processor, including a graphical user interface (GUI) configured to provide an interface for vehicle device 110 to the user.

Vehicle device 110 may further include database 116 which may include, for example, identifiers such as operating system registry entries, cookies associated with check-in application 120, payment application 112, and/or other applications 114, identifiers associated with hardware of vehicle device 110, or other appropriate identifiers, such as identifiers used for payment/user/device authentication or identification. In one embodiment, identifiers in database 116 may be used by payment provider server 150 to associate vehicle device 110 with a particular account maintained by payment provider server 150. Database 116 may also store user 102's information, including check-in information, an identifier, etc., for user 102. Database 116 may also include entitlements, settings, parameters, and/or preferences for user 102 for use with the vehicle corresponding to vehicle device 110.

Vehicle device 110 includes at least one communication module 118 adapted to communicate with merchant device 130 and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with merchant device 130 and/or a vehicle device functioning similar to vehicle device 110 using short range communications, such as Bluetooth Low Energy, LTE Direct, radio frequency, infrared, Bluetooth, and near field communications.

Merchant device 130 may be implemented using any appropriate hardware and software configured for wired and/or wireless communication with vehicle device 110 and/or payment provider server 150. Merchant device 130 may correspond to a device utilized by a merchant and/or merchant employee at a merchant location in order to identify user 102 through vehicle device 110 and provide one or more items to a user operating the vehicle corresponding to vehicle device 110 (e.g., user 102 or another user). Thus, merchant device 130 may be used to process payment requests for user 102. Thus, merchant device 130 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly.

Merchant device 130 of FIG. 1 contains an identification application 140, a merchant application 132, other applications 134, a database 136, and a communication module 138. Identification application 140, merchant application 132, and other applications 134 may correspond to processes, procedures, and/or applications, for example, a software program, executable by a hardware processor. In other embodiments, merchant device 130 may include additional or different software as required.

Identification application 140 may include processes to connect with and/or complete a check-in with vehicle device 110 for a merchant location corresponding to merchant device 130. Thus, identification application 140 may correspond to the merchant device side application configured to receive check-in information from user device 110 and complete the check-in through short range wireless communications, as previously discussed. In other embodiments, identification application 140 may instead receive location information for the vehicle corresponding to vehicle device 110, for example, over network 170 from a check-in and/or mapping service, in order to associate the vehicle with the merchant location. Once a connection and/or check-in is established for vehicle device 110, identification application 140 may receive identification information from vehicle device 110 and/or payment provider server 150 for use in identifying user 102 associated with the vehicle corresponding to vehicle device 110.

Thus, identification information may receive a user account with the merchant corresponding merchant device 130 or an account with payment provider server 150. For example, the identification information may include an identifier or other account information for a user/payment account of user 102. However, in embodiments where a user account has not been previously established by user 102, identification application 140 may receive other information identifying user 102, including a user name/identifier, user device identifier, an identifier for an account with another server (e.g., service provider server 160), or other information. Once user 102 has been identified by identification application 140 using vehicle device 110, information set by user 102 for the vehicle corresponding to vehicle device 110 may also be accessed and/or received by identification application 140.

Identification application 140 may therefore receive and/or access entitlements for user 102 and/or settings, parameters, and/or preferences for the vehicle corresponding to vehicle device 110 set by user 102. As previously discussed, entitlements loaded to identification application may correspond to, e.g., one or more pre-purchased items, a prescription or other right to an item not normally available (or available publically/generally), or a maintenance plan for the vehicle. Once one or more entitlements are loaded to identification application 140, a merchant corresponding to merchant device 130 may complete a transaction for the item(s) associated with the entitlement(s) using merchant application 132. Since user 102 is identified using vehicle device 110, user 102 may or may not be required to be located with vehicle device 110, for example, at the merchant location. However, if additional fraud protection is required for the transaction, a connection between a user device or an additional identification request (e.g., a driver's license/passport) be used with the identification of user 102 through vehicle device 110 to add an extra layer of security to the transaction.

In other embodiments, identification application 140 may load settings, parameters, and/or preferences for usage of a vehicle corresponding to vehicle device 110 that are set by user 102. Such preferences may correspond to fuel type/octane rating, vehicle usage, maintenance requirements, and/or other types of set preferences for usage of the vehicle. The merchant corresponding to merchant device 130 may initiate a transaction for one or more items from the preference with the operator of the vehicle (e.g., user 102 and/or another user utilizing a vehicle associated with user 102). Thus, user 102 may control the usage of the vehicle even if user 102 is not located with the vehicle. As previously discussed, the preferences may be locked to prevent changes in a transaction, or may be changed by an operator of the vehicle.

In various embodiments, identification application 140 may detect a user device connected to merchant device 130 and associated with the identity for vehicle device 110. The user device may belong to the same user as the identity for vehicle device 110. Thus, the user device may transmit the same or similar identifier, check-in information, and/or identification information for the identity as vehicle device 110. Thus, identification application 140 may verify the identity of the user corresponding to the user device and vehicle device 110 using the connection with the user device. Such verification may act as fraud prevention, thus ensuring that at least two devices for the user are at the same location and therefore the user is likely at the same location. The user device and vehicle device 110 may be linked through sharing an identifier or identifiers for each device may be associated (e.g., through a trusted device list set with merchant device 130 and/or payment provider server 150). In other embodiments, transactions, linked/shared accounts, social media information, and/or other scraped information for each device may be utilized to associate the devices.

Additionally, a user device for another user (e.g., the operator of a vehicle corresponding to vehicle device 130) may also be detected by identification application 140 (e.g., through a connection with merchant device 130. The user device for the other user may therefore be located in proximity to vehicle device 110, for example, at the same location (e.g., merchant location). If such a user device is detected, identification application 140 may determine if the other user associated with the user device (e.g., the owner/holder of the user device) is a trusted user for the user identified with the vehicle corresponding to vehicle device 110. The user may be a trusted user of the user associated with the vehicle based on a trusted user list with merchant device 130 and/or payment provider server 150, past transactions between the users, shared/linked user accounts, scraped information about the two users, same surnames, addresses, or financial accounts, or through other available information linking the two users. If the other user is a trusted user for the user associated with the vehicle, the other user may be allowed to utilize, purchase, or otherwise obtain the entitlements, settings, parameters, and/or preferences for the user associated with the vehicle.

Merchant application 132 may be used, for example, to provide a convenient interface to permit a merchant corresponding to merchant device 130 to enter, view, and/or edit information for one or more purchasable items using information received based on a connection/check-in of vehicle device 110. Thus, merchant application 132 may be implemented as an application having an API accessible by vehicle device 110, identification application 140, and/or payment provider server 150 that may receive item information corresponding to entitlements, settings, parameters, and/or preferences established by user 102. Merchant application 132 may also provide information to vehicle device 110, such as a menu of available items, prices for available items, pick-up/delivery information, benefits for the items (including loyalty accounts and/or benefits accrued for user 102), and/or merchant account services. Such information may enable an operator of the vehicle corresponding to vehicle device 110 to make selections and generate a payment request for items available from merchant device 130.

Thus, merchant application 132 may provide information for available items to the operator of the vehicle corresponding to vehicle device 110, complete purchases of items by the operator, and generate receipts and transaction histories for the operator. Merchant application 132 may therefore provide a convenient interface to permit the merchant and/or a merchant employee to view selected item information and complete a transaction for the items (e.g., receive payment for the items/services). Merchant application 132 may be utilized to request and process a payment for the items through physical payment instruments, such as cash and/or payment cards from the operator of the vehicle, or payment accounts with a payment provider. Thus, merchant application 132 may also be utilized to run payment cards, complete cash transactions, and/or otherwise complete payment for the order. Once payment for the order is complete, merchant application 132 may be configured to generate a receipt and create, update, and/or process a transaction history for user 102. Such transaction histories may be provided to vehicle device 110.

Merchant device 130 includes other applications 134 as may be desired in particular embodiments to provide features to merchant device 130. For example, other applications 134 may include security applications for implementing device-side security features, programmatic client applications for interfacing with appropriate application programming interfaces (APIs) over network 170, or other types of applications. Other applications may include inventory, mapping, and/or service applications configured to assist a merchant and/or user 102 with one or more purchases. Other applications 134 may contain software programs, executable by a processor, including a graphical user interface (GUI) configured to provide an interface to a user and/or administrator of merchant device 130.

Merchant device 130 may further include database 136 which may include, for example, identifiers such as operating system registry entries, cookies associated with merchant application 132 and/or other applications 134, identifiers associated with hardware of merchant device 130, or other appropriate identifiers, such as identifiers used for payment/user/device authentication or identification. Identifiers in database 136 may be used by a payment provider server 150 to associate merchant device 130 with a particular account maintained by payment provider server 150. Database 136 may include connection and/or check-in information for vehicle device 110 used to identify user 102, even if user 102 is not presently located with the vehicle corresponding to vehicle device 110. Database 136 may further store orders and/or payments by user 102 to be fulfilled by the merchant corresponding to merchant device 130, for example, pre-orders, prescriptions, and/or order plans. Such orders/payment may be recalled by user 102 using vehicle device 110, as previously discussed.

Merchant device 130 includes at least one communication module 138 adapted to communicate with vehicle device 110 and/or payment provider server 150 over network 170. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with vehicle device 110 using short range communications, such as Bluetooth Low Energy, LTE Direct, radio frequency, infrared, Bluetooth, and near field communications.

Payment provider server 150 may be maintained, for example, by an online payment service provider, which may provide payment services and/or processing for financial transactions on behalf of a user. Additionally, payment provider server 150 may assist user 102 in associating an identity with a vehicle belonging to vehicle device 110. In this regard, payment provider server 150 includes one or more processing applications which may be configured to interact with vehicle device 110 and/or merchant device 130. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide services to user 102, an operator of a vehicle corresponding to vehicle device 110, and/or merchant corresponding to merchant device 130.

Payment provider server 150 of FIG. 1 includes an identity application 160, a transaction processing application 152, other applications 154, a database 156, and a network interface component 158. Identity application 160, transaction processing application 152, and other applications 154 may correspond to processes, procedures, and/or applications, for example, a software program, executable by a hardware processor. In other embodiments, payment provider server 150 may include additional or different software as required, such as a check-in process as discussed in reference to another entity (e.g., a service provider offering location based check-ins) and/or merchant device 130.

Identity application 160 may include features and processes for execution by an application that may be configured to allow user 102 to associate an identity to a vehicle corresponding to vehicle device 110. In this regard, user 102 may access an interface for identity application 160 utilizing a user device and/or vehicle device 110 in order to establish an identity to utilize when vehicle device 110 connects to a device and/or checks-in to a location by providing an identifier, name, account, or other identification information for user 102. Such identification information may be stored by payment provider server 150 and/or established with vehicle device 110 for usage. Additionally, user 102 may establish one or more entitlements, settings, parameters, and/or preferences for use with the identification information. Such established information may be recalled for use with the vehicle corresponding to vehicle device 110 when vehicle device 110 connects to a device/server and/or checks-in to a location.

Transaction processing application 152 may be configured to receive information from and/or transmit information between vehicle device 110 and/or merchant device 130 for processing and completion of financial transactions. Transaction processing application 152 may include one or more applications to process financial transaction information by receiving a payment request to complete transaction corresponding to vehicle device 110. The payment request may correspond to a payment from user 102 and/or an operator of the vehicle to a merchant corresponding to merchant device 130. The payment request may include a paying user account identifier or other payment information (e.g. a credit/debit card or checking account) and a receiving account. Additionally, the payment request may include a payment amount and terms of payment. Transaction processing application 152 may complete the transaction by providing payment to the merchant through the receiving account/payment information. Additionally, transaction processing application 152 may provide transaction histories, including receipts, to vehicle device 110 and/or merchant device 130 for completion and documentation of the financial transaction. For example, a transaction history may be provided to vehicle device 110 and/or merchant device 130 to allow user 102, the operator of the vehicle, and/or the merchant to view the transaction.

In various embodiments, payment provider server 150 includes other applications 154 as may be desired in particular embodiments to provide features to payment provider server 150. For example, other applications 154 may include security applications for implementing server-side security features, programmatic server applications for interfacing with appropriate application programming interfaces (APIs) over network 170, or other types of applications. Other applications 154 may contain software programs, executable by a processor, including a graphical user interface (GUI), configured to provide an interface to a user.

Additionally, payment provider server 150 includes database 156. As previously discussed, user 102, a merchant corresponding to merchant device 130, and/or the operator of the vehicle corresponding to vehicle device 110 may establish one or more payment accounts with payment provider server 150. User accounts in database 156 may include user information, such as name, address, birthdate, payment/funding information, additional user financial information, and/or other desired user data. Account holders may link to their respective payment accounts through a user, and/or device identifier. Thus, when an identifier is transmitted to payment provider server 150, e.g. from vehicle device 110 and/or merchant device 130, a payment account may be found. In other embodiments, user 102, the merchant, and/or the operator may not have previously established a payment account and may provide other financial information to payment provider server 150 to complete financial transactions, as previously discussed. Additionally, database 156 may store received information, such as identities, entitlements, settings, parameters, and/or preferences for use with vehicle device 110.

In various embodiments, payment provider server 150 includes at least one network interface component 158 adapted to communicate vehicle device 110 and/or merchant device 130 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
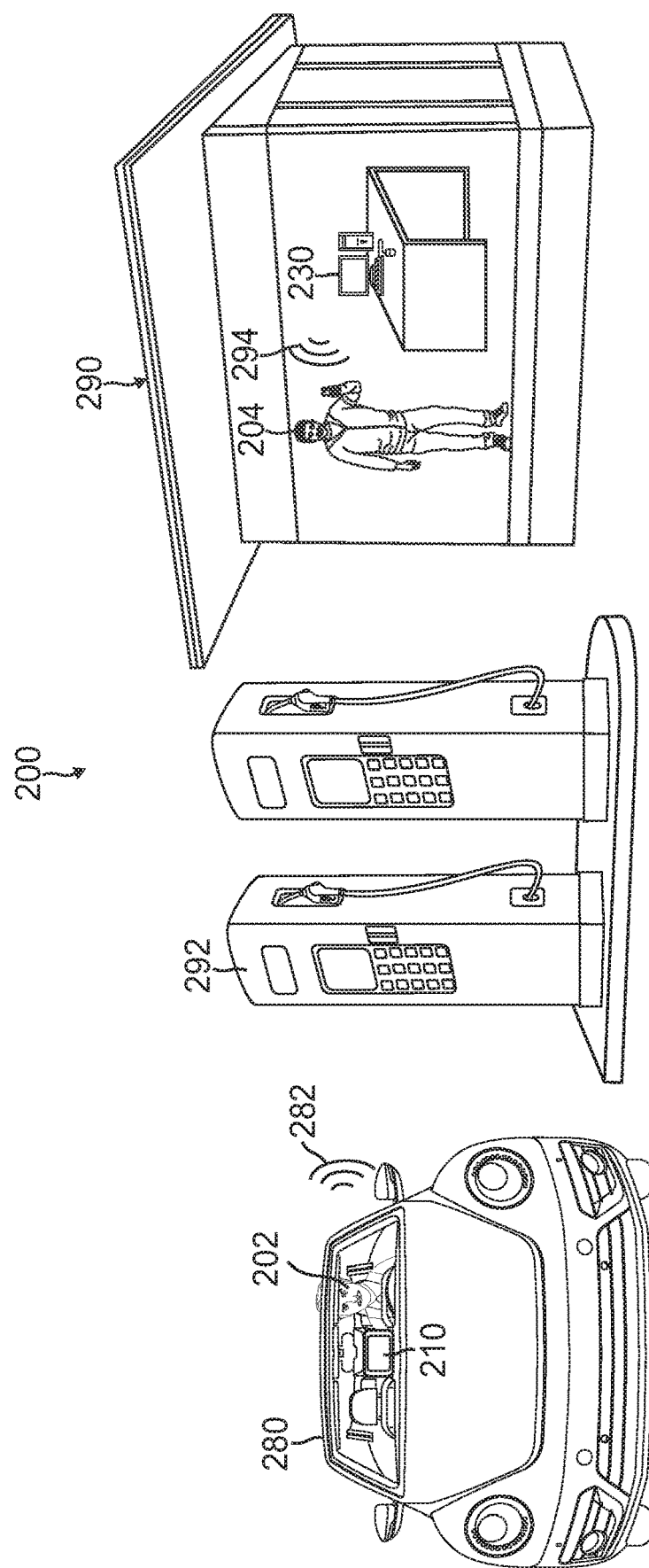
FIG. 2 is an exemplary environment showing a vehicle connecting to a merchant device when arriving at a merchant location, according to an embodiment.

FIG. 2 is an exemplary environment showing a vehicle connecting to a merchant device when arriving at a merchant location, according to an embodiment. Environment 200 of FIG. 2 includes a user 202 and a vehicle device 210 corresponding generally to user 102 and vehicle device 110, respectively, of FIG. 1. Moreover, environment 200 includes a merchant device 230 corresponding generally to merchant device 130 of FIG. 1.

User 202 is utilizing a vehicle 280 having a vehicle device 210 mounted in or connected to vehicle 280. User 202 may correspond to user 102 in FIG. 1, and thus be an owner of vehicle 280 as well as the operator of vehicle 280. However, in other embodiments, user 202 may be an operator of vehicle 280 and not own vehicle 280, such that vehicle 280 is owned by another user who may set their identity to be associated with vehicle 280. In such embodiments, vehicle 280 may be owned by a family or relative of user 202 and may be utilized by user 202. Vehicle 280 may also comprise a vehicle owned by a service that offers use of vehicle 280 to user 202, such as a vehicle rental service, a fleet vehicle service, a company employing or associated with user 202, and/or a car share service. Thus, when vehicle device 210 connects to another vehicle device and/or merchant device 230, the identity set with vehicle 280 may be accessed and/or determined.

As shown in environment 200, vehicle 280 arrives at a merchant location 290 having a gas pump 292. When arriving at merchant location 290, vehicle device 210 may transmit communications 282 for reception by merchant device 230. Merchant device 230 may receive communications 282 and respond with communications 294 in order to establish a communication channel. Once vehicle device 210 and merchant device 230 have connected, a check-in for vehicle 280 at merchant location 290 may be completed that associates vehicle 280 with merchant location 290. Using the connection and/or check-in, an identity associated with vehicle 280 may be accessed and/or determined by merchant device 230, for example, by utilizing an identifier received from vehicle device 210. The identity may be accessed from a payment provider, in various embodiments. However, merchant device 230 may also receive the identifier from vehicle device 230.

Once an identity associated with vehicle 280 is determined, entitlements, settings, parameters, and/or preferences for that identity may be transmitted to vehicle device 210 for display to user 202. User 202 may then view the aforementioned information stored for use with vehicle 280. Additionally, the identity and entitlements, settings, parameters, and/or preferences may be displayed to a merchant 204 on merchant device 230. This enables merchant 204 to process and complete a transaction corresponding to the entitlements, settings, parameters, and/or preferences for vehicle 280.

For example, a preference for use of vehicle 280 that is stored by the owner of vehicle 280 may be for a certain octane rating of fuel provided at merchant location 290. Thus, when vehicle 280 arrives at a fuel pump 292 at merchant location 290, the octane rating of fuel for use with vehicle 280 may be displayed to user 202 on vehicle device 210. Additionally, merchant 204 may view the octane rating on merchant device 230. Once the octane rating is displayed to user 202 and/or merchant 204, a transaction for fuel having that octane rating may be initiated and completed, and user 202 may utilize fuel pump 292 with vehicle 280. In various embodiments, the preference of the octane rating for vehicle 280 may be locked so that user 202 and merchant 204 may only engage in a transaction for the octane rating set for vehicle 280. However, in other embodiments, user 202 and merchant 204 may alter the preference and utilize a different octane rating if the owner of vehicle 280 has allowed for changes to vehicle 280's preferences.

Figure 3:
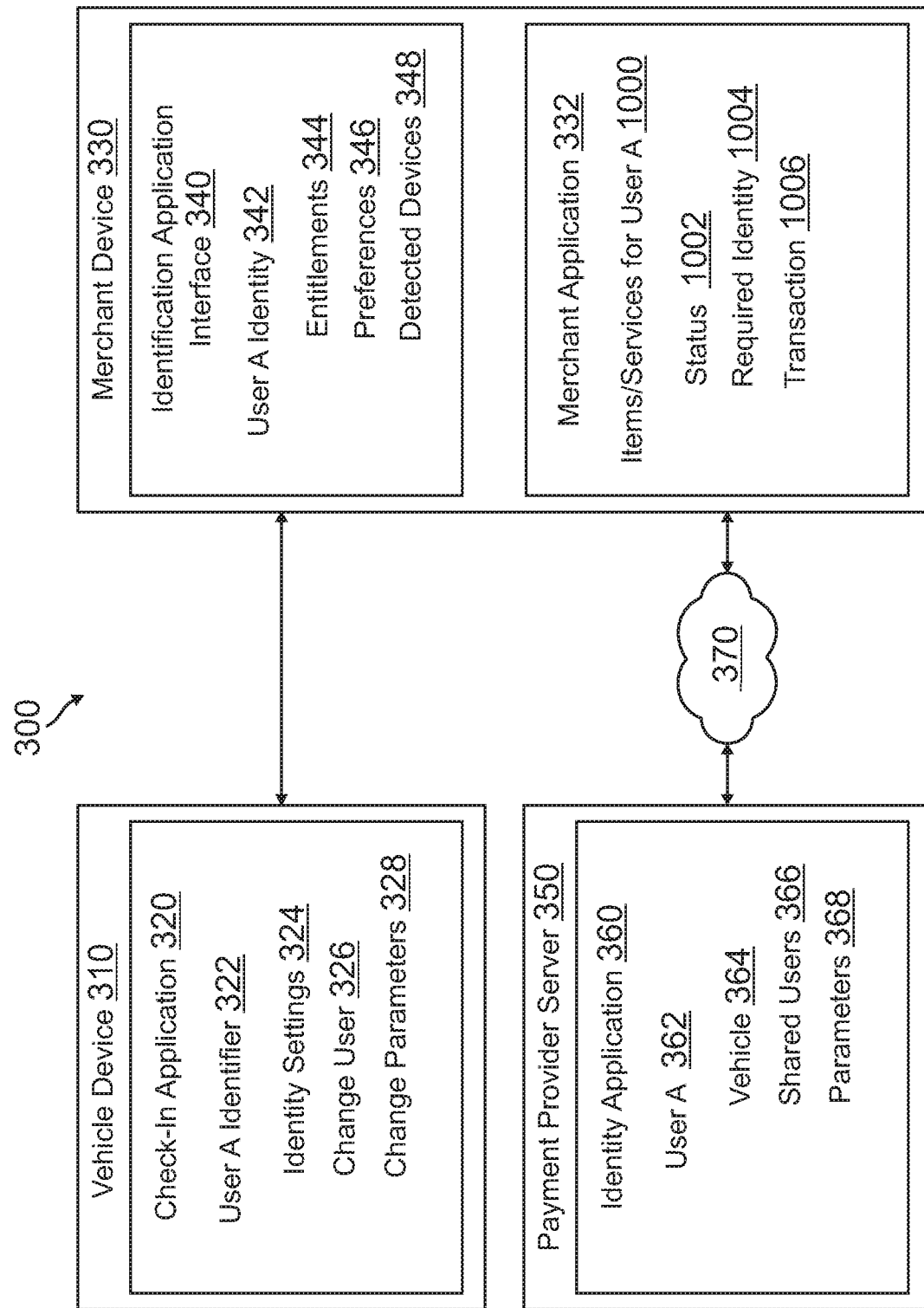
FIG. 3 is an exemplary system environment having parameters transmitted to a merchant device when a vehicle connects to the merchant device, according to an embodiment.

FIG. 3 is an exemplary system environment having parameters transmitted to a merchant device when a vehicle connects to the merchant device, according to an embodiment. Environment 300 includes a vehicle device 310, a merchant device 330, and a payment provider server 350 corresponding generally to vehicle device 110, merchant device 130, and payment provider server 150, respectively, of FIG. 1.

Vehicle device 310 includes a check-in application 320 corresponding generally to the processes and features described in reference to check-in application 120 of FIG. 1. Check-in application 320 includes a user A identifier 322 that may be utilized to connect and/or check-in to merchant device 330. Thus, user A identifier 322 may be transmitted to merchant device 330 for use in establishing the identity associated with vehicle device 310. Once a connection is established with merchant device 330, identity settings 324 may be loaded to vehicle device 310 and/or merchant device 330 for use in establishing entitlements, settings, parameters, and/or preferences associated with user A identified by user A identifier 322. Additionally, a user of vehicle device 310 may be given options to change user 326 and/or change parameters 328. However, in other embodiments, the identity for vehicle device 310 and/or the entitlements, settings, parameters, and/or preferences associated with the identity may be locked and prevented from being changed.

Once a connection is established for a vehicle associated with vehicle device 310 using user A identifier 322, merchant device 330 may receive the identity corresponding to the vehicle. Thus, merchant device 330 includes an identification application interface 340 and a merchant application 332 corresponding generally to the processes and features described in reference to identification application 140 and merchant application 132, respectively, of FIG. 1. Identification application interface 340 may display to a merchant utilizing merchant device 330 a user A identity 342 determined from user A identifier 322. User A identity 342 may be receive from user A identifier 322 or may be accessed from payment provider server 350 using user A identifier 322. Once user A identity 342 is established, entitlements 344, preferences 346, and detected devices 348 may be determined. As previously discussed, entitlements 344 may include various rights that user A identity 342 has to items and/or services. Similarly, preferences 346 may include settings, parameters, and/or preferences for use of the vehicle. Detected devices 348 may include other detected devices associated with user A identity 342 and may be utilized as an extra form of identification to prevent fraud.

Thus, merchant device 330 may receive information from payment provider server 350 to load information displayed in identification application interface 340. Payment provider server 350 includes an identity application 360 corresponding generally to the processes and features described in reference to identity application 160 of FIG. 1. Identity application 360 includes a user A 362 having vehicle 364 identifying the vehicle associated with user A 362, shared users 366 identifying user allowed to utilize the vehicle, and parameters 368 indicating parameters for use of the vehicle. The aforementioned information for user A 362 may be transmitted to merchant device 330 when receiving user A identifier 322 from merchant device 330 over a network 370.

Once an identity is established that is associated with vehicle device 310, merchant application 322 may be utilized to complete a transaction for one or more items. Merchant application 322 includes items/services for user A 1000 that may corresponding to one or more items identified in entitlements 344 and/or preferences 346. Items/services for user A 1000 include a status 1002 corresponding to a status of the items (e.g., prepared and ready for sale), required identity 1004 for receiving the items, and a transaction 1006 corresponding to a payment for the items.

Figure 4:
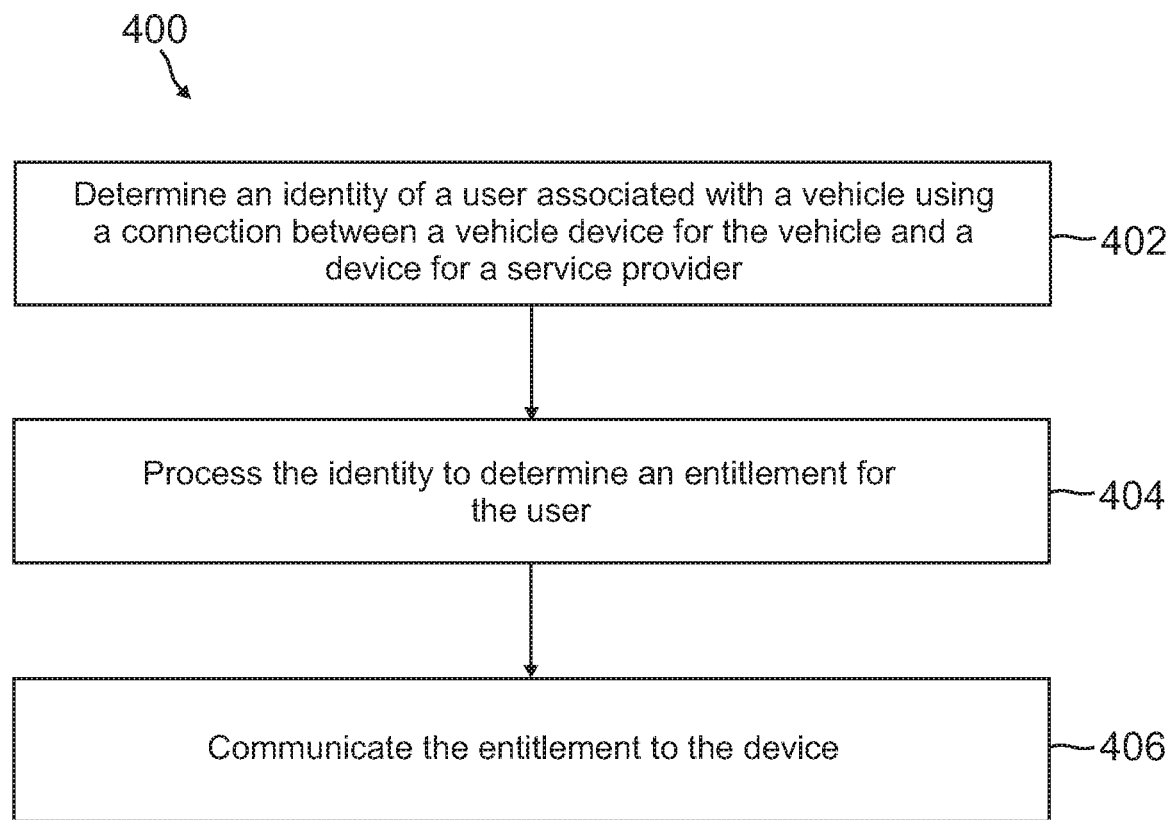
FIG. 4 is a flowchart of an exemplary process for utilizing a vehicle to determine an identity of a user, according to an embodiment.

FIG. 4 is a flowchart of an exemplary process for utilizing a vehicle to determine an identity of a user, according to an embodiment. Note that one or more steps, processes, and methods described herein may be omitted, performed in a different sequence, or combined as desired or appropriate.

At step 402, an identity of a user associated with a vehicle is determined using a connection between a vehicle device for the vehicle and a device for a service provider. The service provider may correspond to a merchant having a merchant device for transaction with the user and/or an operator of the vehicle. The device may include a wireless beacon utilizing a short range communication protocol, such as one of near field communication, radio communication, infrared communication, Bluetooth communication, Bluetooth Low Energy (BLE) communication, LTE Direct communication, and WiFi communication, and wherein the vehicle device and the merchant device connect using the short range communication protocol. A second user may be utilizing the vehicle, where the user associated with the vehicle is not present in the vehicle. The user may also check-in to the vehicle using one of a user device connecting to the vehicle device and the vehicle device.

The identity is processed to determine an entitlement for the user, at step 404. The entitlement may comprise a prescription for the first user with the merchant, a pre-order of an item by the first user with the merchant, a service requested by the first user, and a maintenance schedule purchased by the first user for the vehicle. Additionally, a request for an item associated with the entitlement may be received by an unknown user at a merchant location corresponding to the device, and a likelihood the unknown user is the user may be determined using the identity and the request. In various embodiments, a user device for the user may be detected at the merchant location, and the likelihood may further be determined based on detecting the user device.

The entitlement may be a preference in other embodiments, such as a preference for an octane rating of fuel to utilize for the vehicle, a type of fuel to utilize for the vehicle, a use of the vehicle by a second user, and a maintenance schedule of the vehicle. The user may lock the preference to prevent changes to the preference in a transaction completed at the merchant location, for example, between the second user utilizing the vehicle and a merchant at the merchant location. In other embodiments, a change to the preference may be received from the second user and the change may be communicated to the device.

At step 406, the entitlement is communicated to the device. The entitlement and/or preference may also be communicated to the vehicle device for display to the user. The service provider/merchant may provide an item to the user based on the entitlement and/or preference. In certain embodiments, a parameter of the user for the vehicle may be determined using the identity, and the parameter may be communicated to a second vehicle device for a second vehicle, such as a vehicle in proximity, connected to, or in communication with the first vehicle. Thus, the second vehicle's user(s) may confirm or deny use of the first vehicle by the user using the identity of the user in the first vehicle and/or the parameter. If the second vehicle's user(s) deny use of the vehicle, they may alert an authority figure. Additionally, the parameter communicated to the second vehicle may include a percentage for a split cost for the user with at least one other user in the second vehicle, a notification for at least one other user in the second vehicle, a waypoint for at least one other user in the second vehicle, and a location for the first vehicle on a map displayable in the second vehicle.

Figure 5:
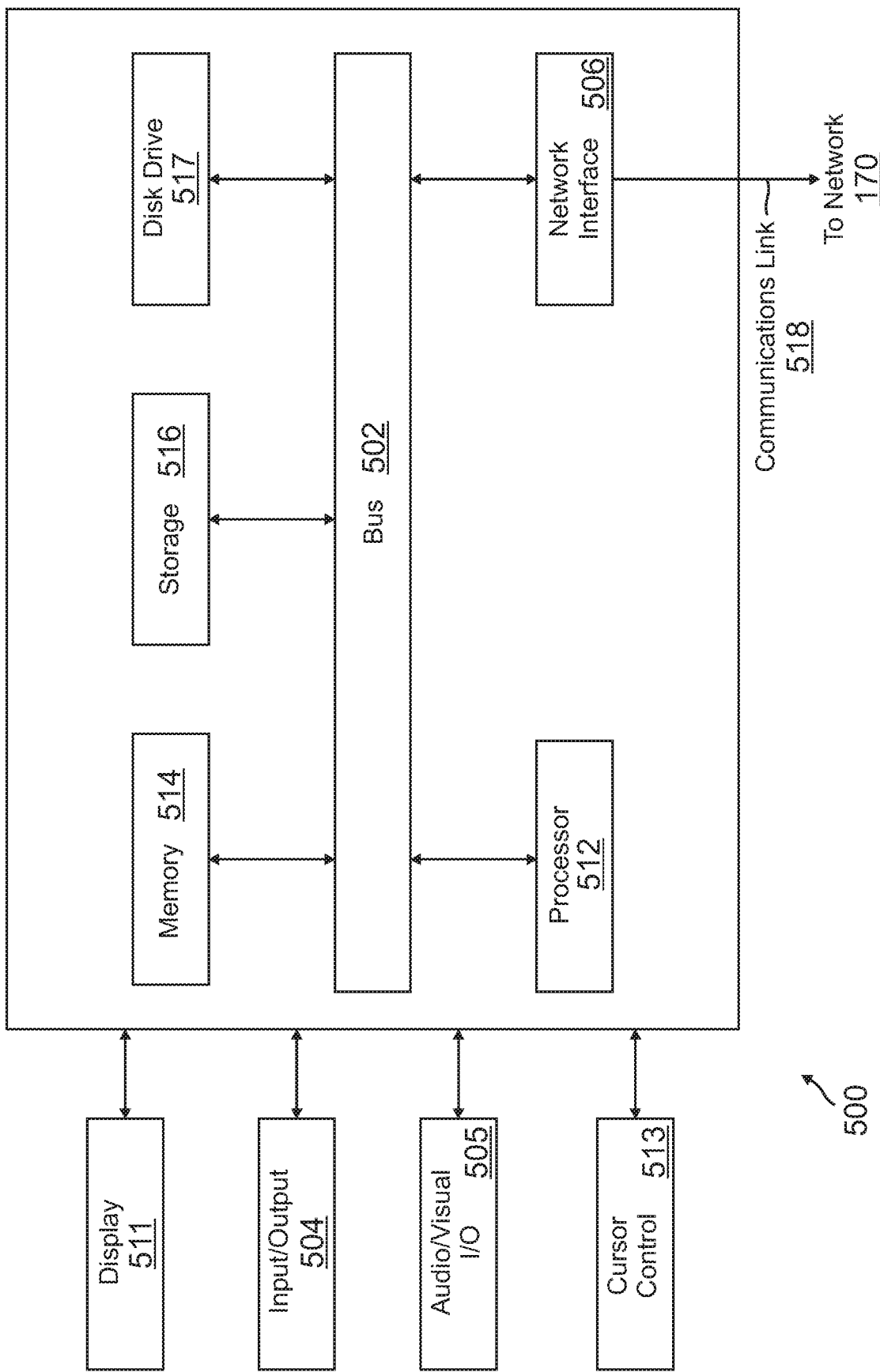
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
connecting, by a communication module of a merchant device of a merchant and at a certain merchant location of the merchant, with an onboard vehicle device of a vehicle within a first distance to the certain merchant location, the connecting for obtaining a user identifier unique to a first user of the vehicle;
receiving, by the communication module, a broadcast of the user identifier from the onboard vehicle device
determining, by a processor of the merchant device based on the user identifier, a transaction processing restriction for transactions of the first user with the merchant;
receiving, by the communication module from the onboard vehicle device, a request for a transaction with the merchant;
detecting, by the merchant device using short range wireless communications and/or geo-location data, a mobile device required for electronic transaction processing of the transaction within a second distance to at least one of the certain merchant location or the vehicle;
authenticating, by the processor, the onboard vehicle device based on the detecting; and
processing, by the processor, the transaction based on the transaction processing restriction and the authenticating.

2. The method of claim 1, wherein the merchant device obtains the user identifier of the first user of the vehicle based on verifying identity information of the first user using a communication from the onboard vehicle device.

3. The method of claim 1, wherein processing the transaction comprises preventing completion of the transaction based on the transaction processing restriction.

4. The method of claim 1, wherein the transaction processing restriction comprises a purchase restriction for an item, and wherein the item comprises one of a fuel rating type, a maintenance item, or a food item.

5. The method of claim 1, wherein the determining the transaction processing restriction comprises obtaining the transaction processing restriction from a payment provider server based on the vehicle, the merchant, and the user identifier.

6. The method of claim 1, further comprising:
communicating the transaction processing restriction to the onboard vehicle device for display.

7. A merchant device comprising:
a non-transitory memory; and
one or more hardware processors coupled to the non-transitory memory and configured to read instructions from the non-transitory memory to cause the merchant device to perform operations comprising:
connecting, by a communication module of the merchant device of a merchant and at a certain merchant location of the merchant, with an onboard vehicle device of a vehicle within a first distance to the certain merchant location, the connecting for obtaining a user identifier unique to a first user of the vehicle;
receiving, by the communication module, a broadcast of the user identifier from the onboard vehicle device
determining, by a processor of the merchant device based on the user identifier, a transaction processing restriction for transactions of the first user with the merchant;
receiving, by the communication module from the onboard vehicle device, a request for a transaction with the merchant;
detecting, by the merchant device using short range wireless communications and/or geo-location data, a mobile device required for electronic transaction processing of the transaction within a second distance to at least one of the certain merchant location or the vehicle;
authenticating, by the processor, the onboard vehicle device based on the detecting; and
processing, by the processor, the transaction based on the transaction processing restriction and the authenticating.

8. The merchant device of claim 7, wherein the merchant device obtains the user identifier of the first user of the vehicle based on verifying identity information of the first user using a communication from the onboard vehicle device.

9. The merchant device of claim 7, wherein processing the transaction comprises preventing completion of the transaction based on the transaction processing restriction.

10. The merchant device of claim 7, wherein the transaction processing restriction comprises a purchase restriction for an item, and wherein the item comprises one of a fuel rating type, a maintenance item, or a food item.

11. The merchant device of claim 7, wherein the determining the transaction processing restriction comprises obtaining the transaction processing restriction from a payment provider server based on the vehicle, the merchant, and the user identifier.

12. The merchant device of claim 7, wherein the operations further comprise:
communicating the transaction processing restriction to the onboard vehicle device for display.

13. The merchant device of claim 7, wherein the operations further comprise:
detecting that the first user is located within the vehicle based on one of connecting with a computing device of the first user, reading a biometric of the first user, or receiving a PIN from the first user.

14. A non-transitory machine-readable medium having stored thereon machine-readable instructions executable to cause a machine to perform operations comprising:
connecting, by a communication module of a merchant device of a merchant and at a certain merchant location of the merchant, with an onboard vehicle device of a vehicle within a first distance to the certain merchant location, the connecting for obtaining a user identifier unique to a first user of the vehicle;
receiving, by the communication module, a broadcast of the user identifier from the onboard vehicle device
determining, by a processor of the merchant device based on the user identifier, a transaction processing restriction for transactions of the first user with the merchant;
receiving, by the communication module from the onboard vehicle device, a request for a transaction with the merchant;
detecting, by the merchant device using short range wireless communications and/or geo-location data, a mobile device required for electronic transaction processing of the transaction within a second distance to at least one of the certain merchant location or the vehicle;

authenticating, by the processor, the onboard vehicle device based on the detecting; and processing, by the processor, the transaction based on the transaction processing restriction and the authenticating.

15. The non-transitory machine-readable medium of claim 14, wherein the merchant device obtains the user identifier of the first user of the vehicle based on verifying identity information of the first user using a communication from the onboard vehicle device.

16. The non-transitory machine-readable medium of claim 14, wherein processing the transaction comprises preventing completion of the transaction based on the transaction processing restriction.

17. The non-transitory machine-readable medium of claim 14, wherein the transaction processing restriction comprises a purchase restriction for an item, and wherein the item comprises one of a fuel rating type, a maintenance item, or a food item.

18. The non-transitory machine-readable medium of claim 14, wherein the determining the transaction processing restriction comprises obtaining the transaction processing restriction from a payment provider server based on the vehicle, the merchant, and the user identifier.

19. The non-transitory machine-readable medium of claim 14, wherein the operations further comprise:

communicating the transaction processing restriction to the onboard vehicle device for display.

20. The non-transitory machine-readable medium of claim 14, wherein the operations further comprise:

detecting that the first user is located within the vehicle based on one of connecting with a computing device of the first user, reading a biometric of the first user, or receiving a PIN from the first user.

\* \* \* \* \*